(12) United States Patent
Sue et al.

(10) Patent No.: US 11,656,477 B2
(45) Date of Patent: May 23, 2023

(54) OPTICAL UNIT WITH SHAKE CORRECTION FUNCTION

(71) Applicant: NIDEC SANKYO CORPORATION, Nagano (JP)

(72) Inventors: Takeshi Sue, Nagano (JP); Shinji Minamisawa, Nagano (JP); Tsutomu Arai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/352,347

(22) Filed: Jun. 20, 2021

(65) Prior Publication Data

US 2021/0397019 A1 Dec. 23, 2021

(30) Foreign Application Priority Data

Jun. 22, 2020 (JP) .............................. JP2020-106665

(51) Int. Cl.
*G02B 27/64* (2006.01)
*G03B 5/06* (2021.01)

(52) U.S. Cl.
CPC ............. *G02B 27/648* (2013.01); *G03B 5/06* (2013.01)

(58) Field of Classification Search
CPC ...... G02B 27/648; G02B 27/646; G02B 7/02; G03B 5/06; G03B 2205/0023; G03B 2205/0069; G03B 5/00; G03B 30/00; G03B 2205/0007
See application file for complete search history.

(56) References Cited

U.S. PATENT DOCUMENTS

| | | | |
|---|---|---|---|
| 8,649,672 B2 | 2/2014 | Takizawa | |
| 9,933,629 B2 | 4/2018 | Minamisawa | |
| 2013/0128360 A1* | 5/2013 | Minamisawa | ....... G02B 27/646 359/554 |

FOREIGN PATENT DOCUMENTS

| | | |
|---|---|---|
| CN | 102472945 | 5/2012 |
| CN | 105247413 | 1/2016 |
| JP | 2010156814 | 7/2010 |
| JP | 2011027949 | 2/2011 |
| JP | 2016099503 | 5/2016 |

OTHER PUBLICATIONS

"Office Action of China Counterpart Application", dated Mar. 2, 2023, with English translation thereof, pp. 1-18.

* cited by examiner

*Primary Examiner* — Robert E. Tallman
(74) *Attorney, Agent, or Firm* — JCIPRNET

(57) ABSTRACT

An optical unit with a shake correction function includes a movable body having an optical element, a swing support mechanism swingably supporting the movable body, a fixed body supporting the movable body through the swing support mechanism, and a magnetic drive mechanism structured to swing the movable body. The magnetic drive mechanism includes a coil fixed to one of the movable body and the fixed body, and a magnet fixed to the other of the movable body and the fixed body. The swing support mechanism includes a first plate spring connecting an end part of the movable body on one side in an optical axis direction with the fixed body, and a second plate spring connecting the other end part of the movable body in the optical axis direction with the fixed body. The magnet and the coil are disposed between the first plate spring and the second plate spring.

5 Claims, 3 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2020-106665 filed Jun. 22, 2020, the entire content of which is incorporated herein by reference.

TECHNICAL FIELD

The present invention relates to an optical unit with a shake correction function which is mounted on a portable terminal or a movement body.

BACKGROUND

Some optical units mounted on a portable terminal or a movement body such as a vehicle and an unmanned helicopter are provided with a shake correction function structured to correct a shake of an optical element by swinging the optical element in order to restrain a disturbance of a photographed image due to a shake of the optical unit. An optical unit described in Japanese Patent Laid-Open No. 2011-27949 (Patent Literature 1) includes a movable body (movable module) having an optical element, a swing support mechanism (plate-shaped spring member) which swingably supports the movable body, a fixed body which supports the movable body from an outer peripheral side through the swing support mechanism, and a magnetic drive mechanism (movable module drive mechanism) structured to swing the movable body. The magnetic drive mechanism includes a coil fixed to the movable body and a magnet which is fixed to the fixed body and faces the coil.

The optical unit described in Patent Literature 1 uses, as a swing support mechanism, a plate-shaped spring member provided with a rectangular frame-shaped movable module side connecting part, a rectangular frame-shaped fixed body side connection part, and four arm parts which connect the movable module side connecting part with the fixed body side connection part. The plate-shaped spring member connects the movable module with the fixed body at a substantially center in an optical axis direction of the movable module.

In the optical unit described in Patent Literature 1, in order to restrain a height in an optical axis direction of the entire optical unit from increasing due to the swing support mechanism, the plate-shaped spring member is disposed at a substantially center in the optical axis direction of the movable module.

However, in Patent Literature 1, the movable module is supported at only one position and thus, a swing center of the movable module is easily deviated and an inclination of the movable body cannot be corrected with a high degree of accuracy. Further, the magnetic drive mechanism structured to swing the movable module is divided and disposed on both sides in the optical axis direction with respect to the plate-shaped spring member and thus, the structure is complicated.

SUMMARY

In view of the problems described above, at least an embodiment of the present invention may advantageously provide an optical unit with a shake correction function which is capable of reducing thickness in an optical axis direction of the optical unit and correcting an inclination of a movable body with a high degree of accuracy.

According to at least an embodiment of the present invention, there may be provided an optical unit with a shake correction function including a movable body having an optical element, a swing support mechanism which swingably supports the movable body, a fixed body which supports the movable body through the swing support mechanism, and a magnetic drive mechanism structured to swing the movable body. The magnetic drive mechanism includes a coil fixed to one of the movable body and the fixed body and a magnet fixed to the other of the movable body and the fixed body, and the magnet and the coil face each other in a direction intersecting an optical axis of the optical element. The swing support mechanism includes a first plate spring which connects an end part of the movable body on one side in a direction of the optical axis with the fixed body, and a second plate spring which connects an end part of the movable body on the other side in the direction of the optical axis with the fixed body, and the magnet and the coil are disposed between the first plate spring and the second plate spring.

In at least an embodiment of the present invention, the swing support mechanism which swingably supports the movable body includes a first plate spring which connects an end part of the movable body on one side in a direction of the optical axis with the fixed body, and a second plate spring which connects an end part of the movable body on the other side in the direction of the optical axis with the fixed body. As described above, one end and the other end in the optical axis direction of the movable body are structured so as to be supported by plate springs and thus, the movable body can be supported in a well-balanced manner and can be supported in a stable state. Therefore, a swing center of the movable body is hard to be deviated and thus, an inclination of the movable body can be corrected with a high degree of accuracy. Further, an arrangement space of the plate spring is small and the plate spring can be disposed on an outer peripheral side of the movable body and thus, thickness of the optical unit in the optical axis direction can be reduced. Further, an arrangement space of a magnetic drive mechanism can be secured between the first plate spring and the second plate spring and thus, a size of the optical unit can be reduced.

In at least an embodiment of the present invention, a swing center of the movable body is located between the first plate spring and the second plate spring when viewed in a direction perpendicular to the optical axis. As described above, the plate springs are disposed on one side and the other side in the optical axis direction with respect to the swing center and thereby the movable body is supported and thus, a deforming amount of the plate spring when the movable body is swung can be reduced and a swing load can be made small. Therefore, electric power consumption of the magnetic drive mechanism can be reduced.

In at least an embodiment of the present invention, the fixed body includes a case which surrounds an outer peripheral side of the movable body, and each of the first plate spring and the second plate spring is provided with a movable body side connecting part connected with the movable body, a fixed body side connection part connected with the case, and an arm part which connects the movable body side connecting part with the fixed body side connection part, and the arm part is extend in a plane intersecting the optical axis. According to this structure, a height in the optical axis direction of an arrangement space of the plate spring is small and thus, thickness in the optical axis direction of the optical unit can be reduced. Further, an arrangement space of the magnetic drive mechanism is easily secured.

In at least an embodiment of the present invention, the fixed body includes a case which surrounds an outer peripheral side of the movable body, and each of the first plate spring and the second plate spring is provided with a movable body side connecting part connected with the movable body, a fixed body side connection part connected with the case, and an arm part which connects the movable body side connecting part with the fixed body side connection part. The arm part of the first plate spring is inclined in a direction toward the one side in the direction of the optical axis as going from the movable body side connecting part to the fixed body side connection part, and the arm part of the second plate spring is inclined in a direction toward the other side in the direction of the optical axis as going from the movable body side connecting part to the fixed body side connection part. As described above, when the first plate spring and the second plate spring are reversely inclined in the optical axis direction, a swing center of the movable body is stabilized and a shake correction can be performed with a high degree of accuracy. Further, a distance between an imaginary plane where the first plate spring is disposed and the swing center, and a distance between an imaginary plane where the second plate spring is disposed and the swing center become small and thus, deforming amounts of the plate springs for inclining the movable body are small. In other words, a swing load for swinging the movable body is smaller in a case that the plate springs are inclined and thus, electric power consumption of the magnetic drive mechanism can be reduced.

In this case, it is preferable that the first plate spring and the second plate spring are formed in the same shape, and the first plate spring and the second plate spring are reversely disposed in the direction of the optical axis. According to this structure, the first plate spring and the second plate spring are symmetrically disposed with the swing center as a reference and thus, the movable body can be further stably supported and a shake correction can be performed with a further high degree of accuracy.

In at least an embodiment of the present invention, the magnetic drive mechanism includes a first magnetic drive mechanism structured to swing the movable body around a first swing axis intersecting the optical axis, and a second magnetic drive mechanism structured to swing the movable body around a second swing axis which intersects the optical axis and intersects the first swing axis, and each of the first magnetic drive mechanism and the second magnetic drive mechanism includes the magnet and the coil. According to this structure, the movable body can be swung in two directions. Therefore, a shake correction in a pitching direction (vertical swing direction) and a shake correction in a yawing direction (lateral swing direction) can be performed.

Effects of the Invention

According to at least an embodiment of the present invention, the swing support mechanism which swingably supports the movable body includes a first plate spring which connects an end part of the movable body on one side in a direction of the optical axis with the fixed body, and a second plate spring which connects an end part of the movable body on the other side in the direction of the optical axis with the fixed body. As described above, one end and the other end in the optical axis direction of the movable body are structured so as to be supported by the plate springs and thus, the movable body can be supported in a well-balanced manner and can be supported in a stable state. Therefore, a swing center of the movable body is hard to be deviated and thus, an inclination of the movable body can be corrected with a high degree of accuracy. Further, an arrangement space of the plate spring is small and the plate spring can be disposed on an outer peripheral side of the movable body and thus, thickness of the optical unit in the optical axis direction can be reduced. Further, an arrangement space of the magnetic drive mechanism can be secured between the first plate spring and the second plate spring and thus, a size of the optical unit can be reduced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Entire Structure)

Figure 1:
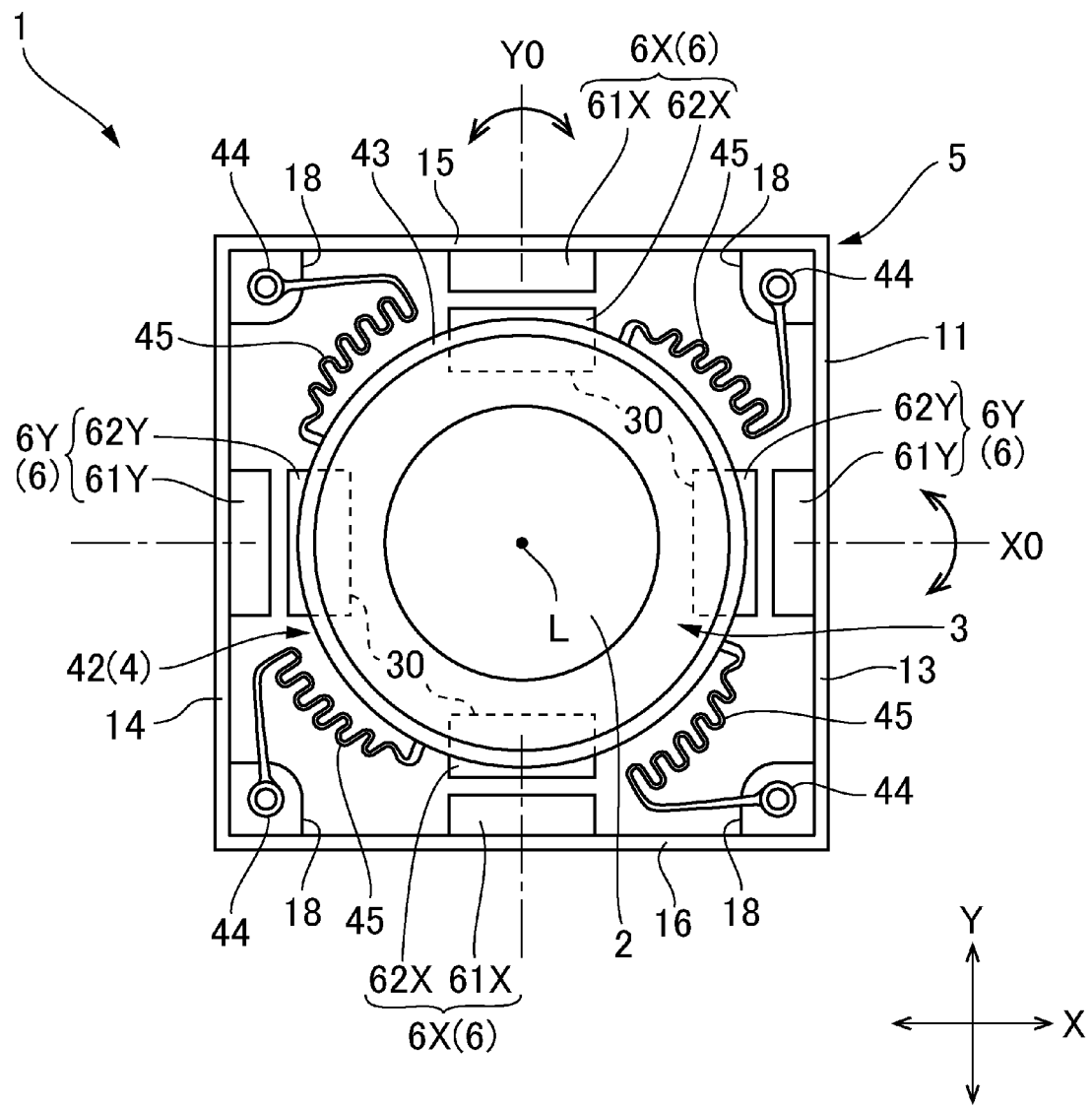
FIG. 1 is a plan view schematically showing an optical unit with a shake correction function to which the present invention is applied.
Figure 2:
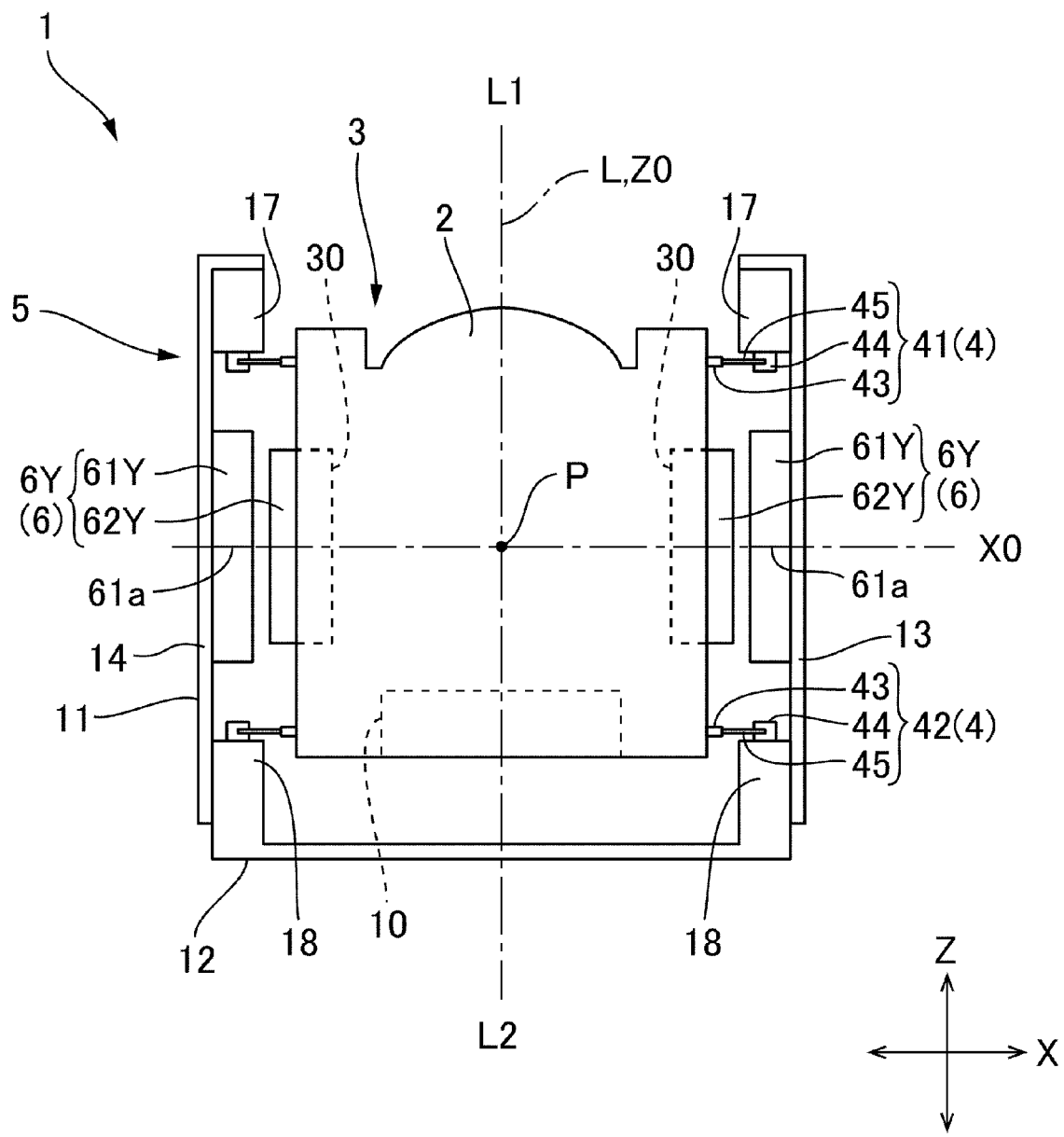
FIG. 2 is a cross-sectional view showing the optical unit with a shake correction function in FIG. 1 which is cut by a plane including an optical axis.

Embodiments of an optical unit 1 with a shake correction function to which the present invention is applied will be described below with reference to the accompanying drawings. FIG. 1 is a plan view showing an optical unit 1 with a shake correction function to which the present invention is applied. FIG. 2 is a cross-sectional view showing the optical unit 1 with a shake correction function in FIG. 1 which is cut by a plane including an optical axis "L". FIGS. 1 and 2 schematically show a structure of an optical unit 1 with a shake correction function.

As shown in FIGS. 1 and 2, an optical unit 1 with a shake correction function (hereinafter, referred to as an optical unit 1) includes a movable body 3 having an optical element 2 and an imaging element 10, a swing support mechanism 4 which swingably supports the movable body 3, and a fixed body 5 which supports the movable body 3 through the swing support mechanism 4. Further, the optical unit 1 includes a magnetic drive mechanism 6 structured to swing the movable body 3.

The movable body 3 is swingably supported by the swing support mechanism 4 between a home position where a predetermined axial line "Z0" and an optical axis "L" of the optical element 2 are coincided with each other and a maximum inclination position where the optical axis "L" is inclined by a predetermined angle (for example, 3°) with respect to the axial line "Z0". In the optical unit 1, an electric current supplied to the magnetic drive mechanism 6 is controlled to swing the movable body 3 between the home position and the maximum inclination position. In this embodiment, the axial line "Z0" is a center axial line of the fixed body 5. FIGS. 1 and 2 show a state that the movable body 3 is stopped at the home position and that the optical axis "L" and the axial line "Z0" are coincided with each other.

As shown in FIG. 1, one side "L1" in the optical axis "L" direction is an object side in the optical unit 1 and the other side "L2" in the optical axis "L" direction is an anti-object side (image side). In the present specification, the axial line "X0", the axial line "Y0" and the axial line "Z0" are perpendicular to each other. The axial line "X0" and the axial line "Y0" are swing axes of the movable body 3, and an intersecting point of the axial line "X0" and the axial line "Y0" is a swing center "P" of the movable body 3. The optical unit 1 is structured so that a shake correction is performed by swinging the movable body 3 around the axial line "X0" and around the axial line "Y0". In the present specification, the axial line "X0" is a first swing axis, and the axial line "Y0" is a second swing axis.

The optical unit 1 is, for example, used in an optical device such as a cell phone with a camera and a drive recorder or in an optical device such as an action camera mounted on a movement body such as a helmet, a bicycle, a radio-controlled helicopter or a wearable camera. In the optical device, when a shake is occurred in the optical device at the time of photographing, a disturbance is generated in a photographed image. In order to avoid a photographed image being inclined, the optical unit 1 corrects an inclination of the optical element 2.

(Fixed Body)

As shown in FIGS. 1 and 2, the fixed body 5 includes a first case 11 in a tube shape which surrounds an outer peripheral side of the movable body 3, and a second case 12 which is fixed to an end part on the other side "L2" (anti-object side) in the optical axis "L" direction of the first case 11. The first case 11 is provided with side plates 13 and 14 facing each other in the axial line "X0" direction and side plates 15 and 16 facing each other in the axial line "Y0" direction. Each of inner peripheral faces of the side plates 15 and 16 facing each other in the axial line "Y0" direction is fixed with a first drive magnet 61X. Further, each of inner peripheral faces of the side plates 13 and 14 facing each other in the axial line "X0" direction is fixed with a second drive magnet 61Y. Since the first case 11 is structured of magnetic material, the first case 11 functions as a yoke for the first drive magnets 61X and the second drive magnets 61Y.

The first case 11 is provided with corner parts at four positions where the side plates adjacent to each other in a circumferential direction are connected with each other at a substantially right angle, and each of the corner parts is provided with a first plate spring fixing part 17 for connecting the swing support mechanism 4. Further, the second case 12 is provided with second plate spring fixing parts 18 for respectively connecting the swing support mechanism 4 at four positions overlapped with the first plate spring fixing parts 17 in the optical axis "L" direction. The first plate spring fixing part 17 is provided at an end part of the first case 11 on one side "L1" in the optical axis "L" direction. Further, the second plate spring fixing part 18 is disposed on an inner peripheral side of an end part of the first case 11 on the other side "L2" in the optical axis "L" direction. The first plate spring fixing part 17 and the second plate spring fixing part 18 are disposed on an outer peripheral side with respect to the movable body 3.

(Movable Body)

As shown in FIG. 2, the movable body 3 includes an optical element 2 such as a lens and an imaging element 10 which is disposed on the optical axis "L" of the optical element 2. As shown in FIG. 1, a shape of the movable body 3 viewed in the optical axis "L" direction is circular. A coil fixing part 30 is provided on an outer peripheral face of the movable body 3. The coil fixing part 30 is provided at four positions on one side and the other side in the "X" direction and on one side and the other side in the "Y" direction. The coil fixing parts 30 on one side and the other side in the "Y" direction are respectively fixed with a first drive coil 62X. Further, the coil fixing parts 30 on one side and the other side in the "X" direction are respectively fixed with a second drive coil 62Y.

A flexible printed circuit board not shown is extended from a portion on the other side "L2" in the optical axis "L" direction of the movable body 3. The flexible printed circuit board is provided in a resiliently bent shape so that the movable body 3 is capable of swinging and is extended to the outside of the first case 11 and the second case 12. The flexible printed circuit board is provided with a signal line and a power feeding line connected with the imaging element 10 and power feeding lines connected with the first drive coils 62X and the second drive coils 62Y.

(Magnetic Drive Mechanism)

The magnetic drive mechanism 6 includes a first magnetic drive mechanism 6X structured to swing the movable body 3 around an axial line "X0" (around the first swing axis) and a second magnetic drive mechanism 6Y structured to swing the movable body 3 around an axial line "Y0" (around the second swing axis). The first magnetic drive mechanism 6X includes two sets of a pair consisting of the first drive magnet 61X and the first drive coil 62X which face each other in the axial line "Y0" direction. The two first drive coils 62X are electrically connected so that magnetic-drive forces are generated in the same direction around the axial line "X0" when power is supplied. Further, the second magnetic drive mechanism 6Y includes two sets of a pair consisting of the second drive magnet 61Y and the second drive coil 62Y which face each other in the axial line "X0" direction. The two second drive coils 62Y are electrically connected so that magnetic-drive forces are generated in the same direction around the axial line "Y0" when power is supplied.

As shown in FIG. 2, the second drive magnet 61Y is polarized and magnetized in two portions in the "Z"-axis direction. Further, the first drive magnet 61X is similarly polarized and magnetized in two portions in the "Z"-axis direction. Therefore, the first drive magnet 61X and the second drive magnet 61Y are magnetized so that magnetic poles on an inner peripheral face side are different from each other with the magnetized polarizing line 61a which is extended in a circumferential direction and is perpendicular to the axial line "Z0" as a boundary. The first drive coil 62X and the second drive coil 62Y are air core coils, and their long side portions on the "+Z" direction side and the "−Z" direction side are utilized as an effective side.

The magnetic drive mechanism 6 swings the movable body 3 around the axial line "X0" by supplying an electric current to the first drive coils 62X. Further, the magnetic drive mechanism 6 swings the movable body 3 around the axial line "Y0" by supplying an electric current to the second drive coils 62Y. In this manner, a shake correction around the axial line "X0" and a shake correction around the axial line "Y0" are performed.

In accordance with an embodiment of the present invention, the magnetic drive mechanism 6 may be structured so that the first drive coils 62X and the second drive coils 62Y are provided in the fixed body 5 and the first drive magnets 61X and the second drive magnets 61Y are provided in the movable body 3.

(Swing Support Mechanism)

As shown in FIG. 2, the swing support mechanism 4 includes a first plate spring 41, which is disposed at an end part of the movable body 3 on one side "L1" in the optical axis "L" direction, and a second plate spring 42 disposed at an end part of the movable body 3 on the other side "L2" in the optical axis "L" direction. The swing support mechanism 4 is provided with a structure that the movable body 3 is supported by the first plate spring 41 and the second plate spring 42. In this embodiment, the shapes of the first plate spring 41 and the second plate spring 42 are the same as each other. The first plate spring 41 and the second plate spring 42 are disposed in a space in a radial direction between the movable body 3 and the first case 11. The first plate spring 41 and the second plate spring 42 are overlapped with the magnetic drive mechanism 6 in the optical axis "L" direction. The coil (first drive coil 62X and second drive coil 62Y) and the magnet (first drive magnet 61X and second drive magnet 61Y) structuring the magnetic drive mechanism 6 are disposed between the first plate spring 41 and the second plate spring 42.

Each of the first plate spring 41 and the second plate spring 42 is provided with a movable body side connecting part 43 connected with the movable body 3, fixed body side connection parts 44 connected with the fixed body 5, and arm parts 45 connecting the movable body side connecting part 43 with the fixed body side connection parts 44. As shown in FIG. 1, the movable body side connecting part 43 is a circular ring-shaped frame part and is fixed to an outer peripheral face of the movable body 3. Four arm parts 45 are disposed at equal intervals in a circumferential direction. An end part on an outer peripheral side of each of the arm parts 45 is provided with the fixed body side connection part 44. Four arm parts 45 and four fixed body side connection parts 44 are respectively formed in the same shape as each other and are disposed point-symmetrically with the optical axis "L" as a center.

In this embodiment, the position, shape and number of the arm parts 45 are not limited to the embodiment shown in FIG. 2 and may be appropriately modified. Further, the fixed body side connection parts 44 may be formed in a frame shape similarly to the movable body side connecting part 43.

Each of the arm parts 45 is provided with a meandering part which is extended while meandering to one side in the circumferential direction and is folded back to the other side in the circumferential direction on an outer peripheral side with respect to the meandering part. In a state that an external force is not applied to the first plate spring 41 and the second plate spring 42, each of the arm parts 45 is disposed in a plane which is perpendicular to the optical axis "L". The fixed body side connection part 44 is provided with a hole to which a protruding part provided in the first plate spring fixing part 17 or the second plate spring fixing part 18 of the fixed body 5 is fitted. The first plate spring 41 is connected with the fixed body 5 by fitting a protruding part provided in the first plate spring fixing part 17 to a hole of the fixed body side connection part 44. Further, the second plate spring 42 is connected with the fixed body 5 by fitting a protruding part provided in the second plate spring fixing part 18 to a hole of the fixed body side connection part 44.

Principal Operations and Effects of this Embodiment

As described above, the optical unit 1 in this embodiment includes the movable body 3 having the optical element 2, the swing support mechanism 4 swingably supporting the movable body 3, the fixed body 5 which supports the movable body 3 through the swing support mechanism 4, and the magnetic drive mechanism 6 structured to swing the movable body 3. The magnetic drive mechanism 6 includes the coil (first drive coil 62X and second drive coil 62Y) which is fixed to the movable body 3 and the magnet (first drive magnet 61X and second drive magnet 61Y) which is fixed to the fixed body 5, and the magnet (first drive magnet 61X and second drive magnet 61Y) and the coil (first drive coil 62X and second drive coil 62Y) face each other in a direction intersecting the optical axis "L" of the optical element 2. The swing support mechanism 4 includes the first plate spring 41 which connects an end part of the movable body 3 on one side "L1" in the optical axis "L" direction with the fixed body 5, and the second plate spring 42 connecting an end part of the movable body 3 on the other side "L2" in the optical axis "L" direction with the fixed body 5. The magnet (first drive magnet 61X and second drive magnet 61Y) and the coil (first drive coil 62X and second drive coil 62Y) are disposed between the first plate spring 41 and the second plate spring 42.

As described above, in this embodiment, the swing support mechanism 4 which swingably supports the movable body 3 is structured by using a plate spring. An arrangement space of the plate spring is small and is capable of disposing on an outer peripheral side with respect to the movable body 3 and supporting the movable body 3. Therefore, thickness in the optical axis "L" direction of the optical unit 1 can be reduced. Further, the one end and the other end in the optical axis "L" direction of the movable body 3 are supported by the first plate spring 41 and the second plate spring 42 and thus, an arrangement space of the magnetic drive mechanism 6 can be secured between the first plate spring 41 and the second plate spring 42. Therefore, a size of the optical unit 1 can be reduced. Further, the one end and the other end in the optical axis "L" direction of the movable body 3 are supported by the first plate spring 41 and the second plate spring 42 and thus, the movable body 3 can be supported in a well-balanced manner and can be supported in a stable state. Therefore, a swing center "P" of the movable body 3 is hard to be deviated and thus, an inclination of the movable body 3 can be corrected with a high degree of accuracy.

In this embodiment, the swing center "P" of the movable body 3 is located between the first plate spring 41 and the second plate spring 42 when viewed in a direction perpendicular to the optical axis "L". As described above, when the movable body 3 is supported by disposing the first plate spring 41 on one side "L1" in the optical axis "L" direction and disposing the second plate spring 42 on the other side "L2" in the optical axis "L" direction with respect to the swing center "P", a deforming amount of the plate spring when the movable body 3 is swung can be reduced. Therefore, a swing load can be reduced and thus, electric power consumption of the magnetic drive mechanism 6 can be reduced.

In this embodiment, the fixed body 5 includes a case (first case 11 and second case 12) surrounding an outer peripheral side of the movable body 3, and each of the first plate spring 41 and the second plate spring 42 is provided with the movable body side connecting part 43 connected with the movable body 3, the fixed body side connection parts 44 connected with the case (first case 11 and second case 12), and the arm parts 45 connecting the movable body side connecting part 43 with the fixed body side connection parts 44. The arm parts 45 are extended in a plane intersecting the optical axis "L". Therefore, each of the first plate spring 41 and the second plate spring 42 is formed in a thin plate shape as a whole and thus, an arrangement space in the optical axis "L" direction is small. Accordingly, a thickness in the optical axis "L" direction of the optical unit 1 can be reduced. Further, an arrangement space of the magnetic drive mechanism 6 is easily secured.

In this embodiment, the magnetic drive mechanism 6 includes the first magnetic drive mechanism 6X structured to swing the movable body 3 around the axial line "X0" (first swing axis) intersecting the optical axis "L", and the second magnetic drive mechanism 6Y structured to swing the movable body 3 around the axial line "Y0" (second swing axis) intersecting the optical axis "L" and intersecting the axial line "X0" (first swing axis). Each of the first magnetic drive mechanism 6X and the second magnetic drive mechanism 6Y includes a magnet and a coil. Therefore, the movable body 3 is capable of being swung in two directions and thus, a shake correction in a pitching direction (vertical swing direction) and a shake correction in a yawing direction (lateral swing direction) can be performed.

Other Embodiments

Figure 3:
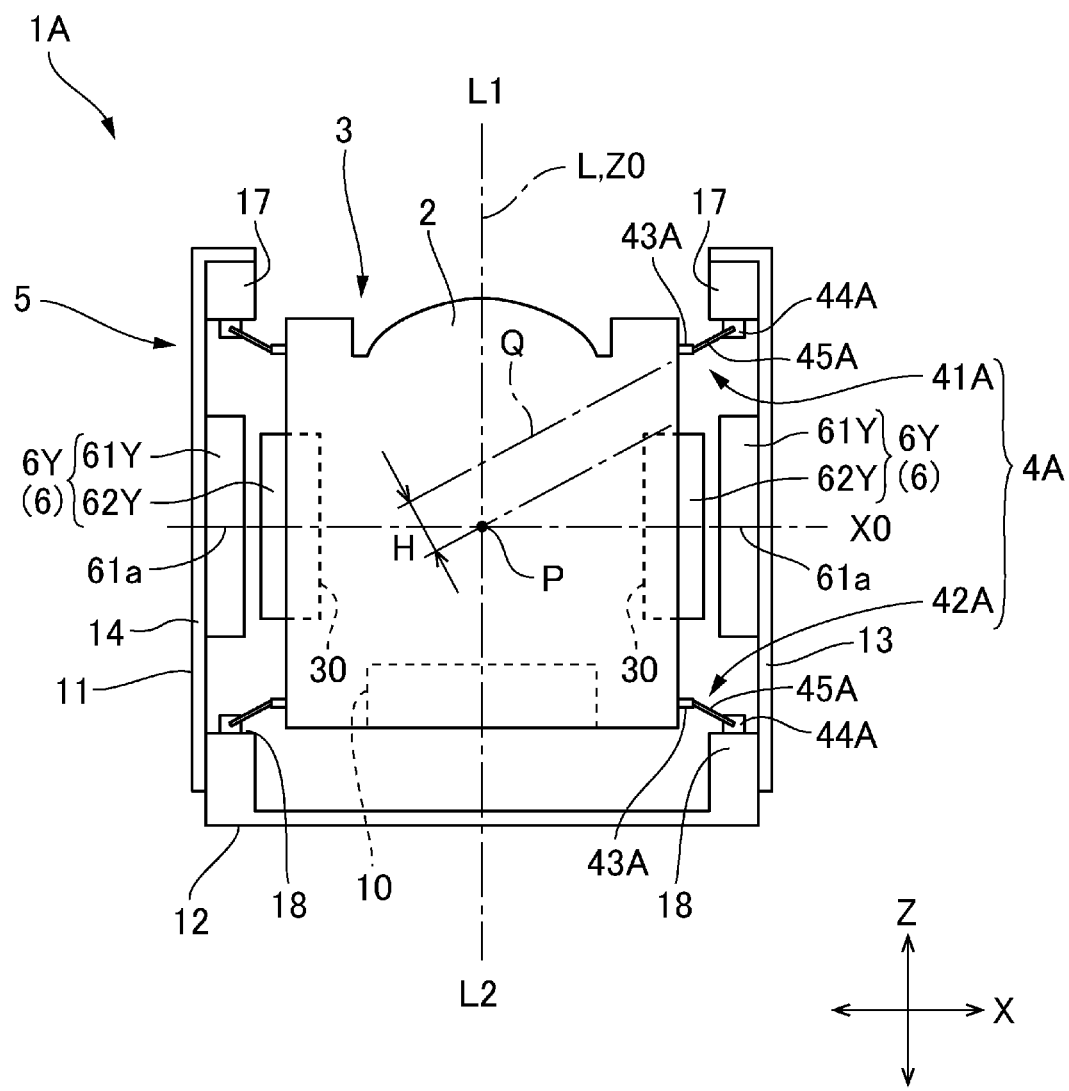
FIG. 3 is a cross-sectional view showing an optical unit with a shake correction function which is cut by a plane including an optical axis in accordance with another embodiment of the present invention.

FIG. 3 is a cross-sectional view showing an optical unit 1A with a shake correction function which is cut by a plane including an optical axis "L" in accordance with another embodiment of the present invention. The optical unit 1A with a shake correction function (hereinafter, referred to as an optical unit 1A) includes a swing support mechanism 4A which swingably supports the movable body 3. The swing support mechanism 4A includes a first plate spring 41A and a second plate spring 42A. In the embodiment described above, the first plate spring 41 and the second plate spring 42 structuring the swing support mechanism 4 are disposed in a plane perpendicular to the optical axis "L". However, in this embodiment, the first plate spring 41 and the second plate spring 42 are inclined with respect to a plane perpendicular to the optical axis "L". Other structures are the same as the embodiment described above and thus, their descriptions are omitted.

In this embodiment, the fixed body 5 includes a case (first case 11 and second case 12) surrounding an outer peripheral side of the movable body 3. Each of the first plate spring 41A and the second plate spring 42A is provided with a movable body side connecting part 43A connected with the movable body 3, fixed body side connection parts 44A connected with the case (first case 11 and second case 12), and arm parts 45A which connect the movable body side connecting part 43A with the fixed body side connection parts 44A.

As shown in FIG. 3, the arm part 45A of the first plate spring 41A is inclined in a direction toward one side "L1" in the optical axis "L" direction as going from the movable body side connecting part 43A to the fixed body side connection part 44A. Further, the arm part 45A of the second plate spring 42A is inclined in a direction toward the other side "L2" in the optical axis "L" direction as going from the movable body side connecting part 43A to the fixed body side connection part 44A. In this embodiment, the first plate spring 41A and the second plate spring 42A are the same shape and are reversely disposed in the optical axis "L" direction. Therefore, an inclination angle of the arm part 45A of the first plate spring 41A with respect to the optical axis "L" and an inclination angle of the arm part 45A of the second plate spring 42A with respect to the optical axis "L" are the same as each other.

In this embodiment, the first plate spring 41A and the second plate spring 42A are inclined and thus, the movable body 3 is pulled to reverse directions in the optical axis "L" direction by the first plate spring 41A and the second plate spring 42A. Therefore, the position of a swing center "P" of the movable body 3 is stable and thus, a shake correction can be performed with a high degree of accuracy.

Further, in this embodiment, a distance "H" between an imaginary plane "Q" on which each of the plate springs is disposed and the swing center "P" is smaller than a distance in the embodiment described above. As a result, a deforming amount of the plate spring for inclining the movable body 3 by a predetermined angle is smaller than a deforming amount of the plate spring in the embodiment described above. In other words, a swing load for swinging the movable body 3 is smaller in this embodiment in which the plate spring is inclined than the embodiment described above. Therefore, electric power consumption of the magnetic drive mechanism 6 can be reduced in comparison with the embodiment described above.

In addition, in this embodiment, the first plate spring 41A and the second plate spring 42A are the same shape, and the first plate spring 41A and the second plate spring 42A are reversely disposed in the optical axis "L" direction. Therefore, the first plate spring 41A and the second plate spring 42A are symmetrically disposed with the swing center "P" as a reference and thus, the movable body 3 can be further stably supported and a shake correction can be further performed with a high degree of accuracy.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, comprising:
    a movable body comprising an optical element;
    a swing support mechanism which swingably supports the movable body;
    a fixed body which comprises a case surrounding an outer peripheral side of the movable body and supports the movable body through the swing support mechanism; and
    a magnetic drive mechanism structured to swing the movable body;
    wherein the magnetic drive mechanism comprises:
        a first magnetic drive mechanism structured to swing the movable body around a first swing axis intersecting an optical axis of the optical element; and
        a second magnetic drive mechanism structured to swing the movable body around a second swing axis which intersects the optical axis and intersects the first swing axis; and
    wherein each of the first magnetic drive mechanism and the second magnetic drive mechanism comprises:
        a coil, fixed to one of the movable body and the case; and
        a magnet, fixed to an other of the movable body and the case;

wherein the magnet and the coil face each other in a direction intersecting the optical axis of the optical element;

wherein the swing support mechanism comprises:
- a first plate spring which connects an end part of the movable body on one side in a direction of the optical axis with the case; and
- a second plate spring which connects an end part of the movable body on an other side in the direction of the optical axis with the case; and wherein each of the first plate spring and the second plate spring comprises:
- a movable body side connecting part connected with the movable body;
- a fixed body side connection part connected with the case; and
- an arm part which connects the movable body side connecting part with the fixed body side connection part;

wherein the magnet and the coil of each of the first magnetic drive mechanism and the second magnetic drive mechanism are disposed between the first plate spring and the second plate spring when viewed in a direction intersecting the optical axis; and wherein, when viewed in a direction of the optical axis, the fixed body side connection parts and the arm parts of the first plate spring and the second plate spring are disposed between the magnet and the coil facing each other of the first magnetic drive mechanism and the magnet and the coil facing each other of the second magnetic drive mechanism.

2. The optical unit with a shake correction function according to claim 1, wherein
a swing center of the movable body is located between the first plate spring and the second plate spring, when viewed in a direction perpendicular to the optical axis.

3. The optical unit with a shake correction function according to claim 1, wherein
the arm part is extended in a plane intersecting the optical axis.

4. The optical unit with a shake correction function according to claim 1, wherein
the arm part of the first plate spring is inclined in a direction toward the one side in the direction of the optical axis as going from the movable body side connecting part to the fixed body side connection part, and
the arm part of the second plate spring is inclined in a direction toward the other side in the direction of the optical axis as going from the movable body side connecting part to the fixed body side connection part.

5. The optical unit with a shake correction function according to claim 4, wherein
the first plate spring and the second plate spring are formed in a same shape, and
the first plate spring and the second plate spring are reversely disposed in the direction of the optical axis.

* * * * *